(12) United States Patent
Tang (10) Patent No.: US 6,502,751 B1
(45) Date of Patent: Jan. 7, 2003

(54) METHODS AND APPARATUS FOR DUAL THRESHOLDING IN PROCESSING OF BARCODE SIGNALS

(75) Inventor: Hong Tang, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/558,652

(22) Filed: Apr. 26, 2000

(51) Int. Cl.[7] .................................................. G06K 7/10
(52) U.S. Cl. .............................. 235/462.25; 235/462.26
(58) Field of Search ........................ 235/462.01, 462.1, 235/462.25, 462.26, 462.27

(56) References Cited

U.S. PATENT DOCUMENTS

| | | | |
|---|---|---|---|
| 4,158,435 A | 6/1979 | Nakanishi et al. ........... 235/463 |
| 4,740,675 A | 4/1988 | Brosnan et al. ............. 235/462 |
| 4,749,879 A | 6/1988 | Peterson et al. ............ 307/354 |
| 4,798,943 A | 1/1989 | Cherry ........................ 235/463 |
| 5,061,843 A | 10/1991 | Sato et al. .................... 235/462 |
| 5,210,397 A | * 5/1993 | Eastman ..................... 235/436 |
| 5,272,323 A | 12/1993 | Martino ....................... 235/462 |
| 5,280,162 A | 1/1994 | Marwin ....................... 235/462 |
| 5,298,728 A | 3/1994 | Elliott et al. ................. 235/463 |
| 5,311,002 A | * 5/1994 | Kamezawa et al. .... 235/472.01 |
| 5,446,272 A | 8/1995 | Barkan ........................ 235/462 |
| 5,463,211 A | 10/1995 | Arends et al. ............... 235/462 |
| 5,545,888 A | 8/1996 | Barkan et al. ............... 235/462 |
| 5,581,072 A | 12/1996 | Bridgelall et al. .......... 235/462 |
| 5,608,201 A | 3/1997 | Coleman, Jr. ............... 235/462 |
| 5,612,531 A | 3/1997 | Barkan ........................ 235/462 |
| 5,811,782 A | 9/1998 | Sato et al. ................... 235/462 |
| 5,828,050 A | * 10/1998 | Barkan ................... 235/462.01 |
| 5,864,129 A | * 1/1999 | Boyd ..................... 235/462.01 |
| 5,949,054 A | 9/1999 | Karpen et al. |
| 6,042,012 A | 3/2000 | Olmstead et al. |
| 6,047,894 A | 4/2000 | Arends et al. |
| 6,328,212 B1 | * 12/2001 | Mtlitasky et al. ...... 235/462.16 |

* cited by examiner

Primary Examiner—Michael G. Lee
Assistant Examiner—Daniel St. Cyr
(74) Attorney, Agent, or Firm—Priest & Goldstein, PLLC (57) ABSTRACT

A system for dual thresholding digital barcode processing. A light reflected from a barcode is captured by a photodetector to produce a photocurrent. The photocurrent is converted to a voltage, amplified and filtered to produce a photovoltage. The photovoltage is differentiated to form a first derivative signal and the first derivative signal is converted to a digital first derivative signal and processed to identify logic transitions represented by the barcode. The processing system subjects the photosignal to Gaussian filtering and differentiates the digital first derivative signal to form a second derivative signal. The digital first derivative signal is compared against a positive and a negative threshold and the second derivative signal is examined to detect zero crossings. When a positive peak of the first derivative exceeds the positive threshold and the second derivative undergoes a negative zero crossing within a predetermined time before or after the positive peak exceeds the positive threshold, a negative logic transition is identified. When a negative peak of the first derivative exceeds the negative threshold and the second derivative undergoes a positive zero crossing within a predetermined time before or after the first derivative exceeds the negative threshold, a positive logic transition is identified.

21 Claims, 8 Drawing Sheets

METHODS AND APPARATUS FOR DUAL THRESHOLDING IN PROCESSING OF BARCODE SIGNALS

FIELD OF THE INVENTION

The present invention relates generally to improved processing of barcode information. More particularly, the invention relates to the advantageous methods and apparatus for determining thresholds for processing of the barcode data to detect transitions in the barcode data.

BACKGROUND OF THE INVENTION

A barcode signal is typically produced by passing or scanning a laser beam across a barcode. The barcode scatters the light from the laser beam onto a lens or mirror which focuses the light onto a photodetector. The photodetector converts the eight into a photocurrent signal. The light falling on the photodetector varies due to modulation by the varying reflectivity of the light and dark bars which make up the barcode. The photocurrent signal changes during the scanning process because the laser passes through light and dark regions as it passes across the barcode, causing variations in the intensity of the light falling on the photodetector. The photocurrent signal thus provides a representation of the regions of lightness and darkness of the barcode, and can be processed to identify logic transitions represented by the barcode.

In a typical barcode scanner, the photocurrent is at a low level while the laser beam is passing over bars and climbs to a high level as the laser beam leaves the bar and passes to a white area. While the laser beam passes over the white area, the photocurrent remains at a high level and as the beam leaves the white area and reaches a bar, the photocurrent descends to a low level. These changes in the level of the photocurrent are processed in order to identify corresponding transitions in the barcode.

In order to help provide for clear identification of transitions between barcode regions, the photocurrent signal is converted into voltage variations, amplified and filtered. A low pass filter is used in order to reduce high frequency noise. The signal is then fed into a series of circuits which produce a first derivative, an inverted first derivative, a second derivative and an inverted second derivative. Peaks and troughs of the first derivative are used to represent upward and downward transitions of the photocurrent signal. The peak and trough are compared to appropriate positive and negative thresholds. If a peak is higher than the positive threshold, the second derivative will be examined for a zero crossing. If a zero crossing is present, a logic state transition from 0 to 1 is identified. Similarly, if a trough is lower than the negative threshold, the second derivative is examined for a zero crossing. If a zero crossing is present, a logic state transition from 1 to 0 is identified.

In typical prior art systems, analog circuitry is used to process the photocurrent signal. Prior art analog systems are able to perform fast processing, and present day scanning systems produce a photocurrent which requires the fast processing which is furnished by analog systems. In the prior art, analog systems have typically been required for sufficiently fast processing at a reasonable cost.

However, there are several disadvantages associated with the use of analog circuitry for processing. Barcode labels differ widely in their characteristics, and because a single scanning station may be required to process many different barcodes, signals with widely varying characteristics may be produced by the same scanner. For example, different signals produced by the same scanner may have different noise characteristics such that it would be advantageous to provide different filtering for different signals. However, in analog systems, filter characteristics cannot be changed without a change of hardware, typically discrete components such as resistors and capacitors having values chosen to provide the desired filtering. Moreover, analog filters introduce phase distortion to the signal, and operational amplifiers, which are most commonly used to provide filtering in analog barcode processing systems, are relatively expensive. Analog barcode processing systems typically require operational amplifiers in sufficient quantities to add significantly to the cost of the system. Furthermore, analog circuitry is limited in the threshold values and characteristics which can be used. It is possible to compensate for this limitation by implementing a dual threshold system, but this approach also adds to the cost of the system.

Another drawback to analog processing of barcodes is that such systems typically require a number of discrete analog components, which adds significantly to the cost and complexity of the system. Moreover, analog systems lack the flexibility to make quick and convenient adjustments to the characteristics of the system, such as the ability to divide a signal into multiple channels or the ability to provide multiple thresholds. The lack of ability to provide multiple thresholds represents a particular challenge for analog systems, because it is difficult to recover the transition edge of a narrow bar or space that follows a wide bar or space. The large bar or space raises the threshold to a high level, and the peaks generated by the narrow bar or space may be lost because they do not meet the threshold value which has been generated by the presence of the wide bar or space.

Still another limitation is that comparators typically used in an analog system have an offset voltage, which is a minimum recognizable difference between inputs, that is, between the input signal and the threshold signal. This offset voltage limits the ability of an analog system to process very small signals. If the photocurrent signal and threshold signal are amplified sufficiently to meet the offset voltage requirement, distortion may be introduced because the amplification may cause the signals to become nonlinear.

There exists, therefore, a need in the art for a barcode processing system which allows flexibility in operation including variable filtering and thresholds, which does not introduce phase distortion, and which is capable of processing small signals.

SUMMARY OF THE INVENTION

A barcode processing system according to the present invention includes a photodetector which produces a photocurrent signal. The photocurrent signal is passed to an amplifier, which may include an automatic gain control circuit in order to insure that the amplified signal possesses enough vertical resolution to allow for the processing of small signals. The amplified signal may be subjected to analog differentiation to produce a first derivative signal. The signal is digitized with an analog to digital converter to produce a digitized signal. The analog to digital converter takes samples of the first derivative signal in order to construct a digital representation of the signal. It measures the signal level and assigns a digital value that is a multiple of the smallest digital increment, $2^{-N}$, where N is the number of output bits of the ADC. The ADC must have a sufficient number of bits of output, and must sample at a sufficient rate, to reduce errors to an acceptable level. The allowable error is preferably less than 5% of the width of the narrowest bar or space of a barcode. The digitized signal is then processed using a digital processor such as an application specific integrated circuit (ASIC) to recover barcode information.

The digital first derivative signal is filtered using a Gaussian filter and differentiated to form a digital second derivative signal. At the same time the digital second derivative signal is created, the digital first derivative signal is analyzed to create a positive and negative threshold in order to compare peaks of the digital first derivative signal against the threshold values. The threshold has a base DC component and an additional AC component. The AC component varies with the digital first derivative signal. If the digital first derivative signal has larger peaks, the AC component of the threshold is larger, and if the digital first derivative signal has smaller peaks, the AC component of the threshold is smaller. The negative threshold may be created by multiplying the positive threshold by negative one. If desired, however, the positive and the negative threshold may be created independently, with the AC component of the positive threshold being set dependent on the positive peaks of the digital first derivative signal and the AC component of the negative threshold being set dependent on the negative peaks of the digital first derivative signal. This approach improves the sensitivity of the system and makes it less likely that a peak will improperly fail to meet the threshold.

Logic transitions are identified by evaluating the digital first derivative signal and the digital second derivative signal. If a peak of the digital first derivative signal exceeds the threshold and a corresponding zero crossing is detected in the digital second derivative signal, a logic transition is recognized. In order for a logic transition to be recognized, the zero crossing must be detected within a predetermined time window of the detection of the peak exceeding the threshold, with the time window being defined according to the sampling rate of the ADC.

A more complete understanding of the present invention, as well as further features and advantages of the invention, will be apparent from the following Detailed Description and the accompanying drawings. An important aspect of the present invention is that it provides a more flexible and adaptable approach to barcode signal processing, and while exemplary advantages are discussed herein, others will be apparent to those of skill in the art.

DETAILED DESCRIPTION

In order to provide for easier adaptation of barcode processing systems to different needs such as changing thresholds, and to overcome problems caused by limitations of analog systems, for example the fixed offset voltages characteristic of analog comparators, barcode processing methods and apparatus according to the present invention employ digital processing of the barcode image as described in further detail below.

Figure 1:
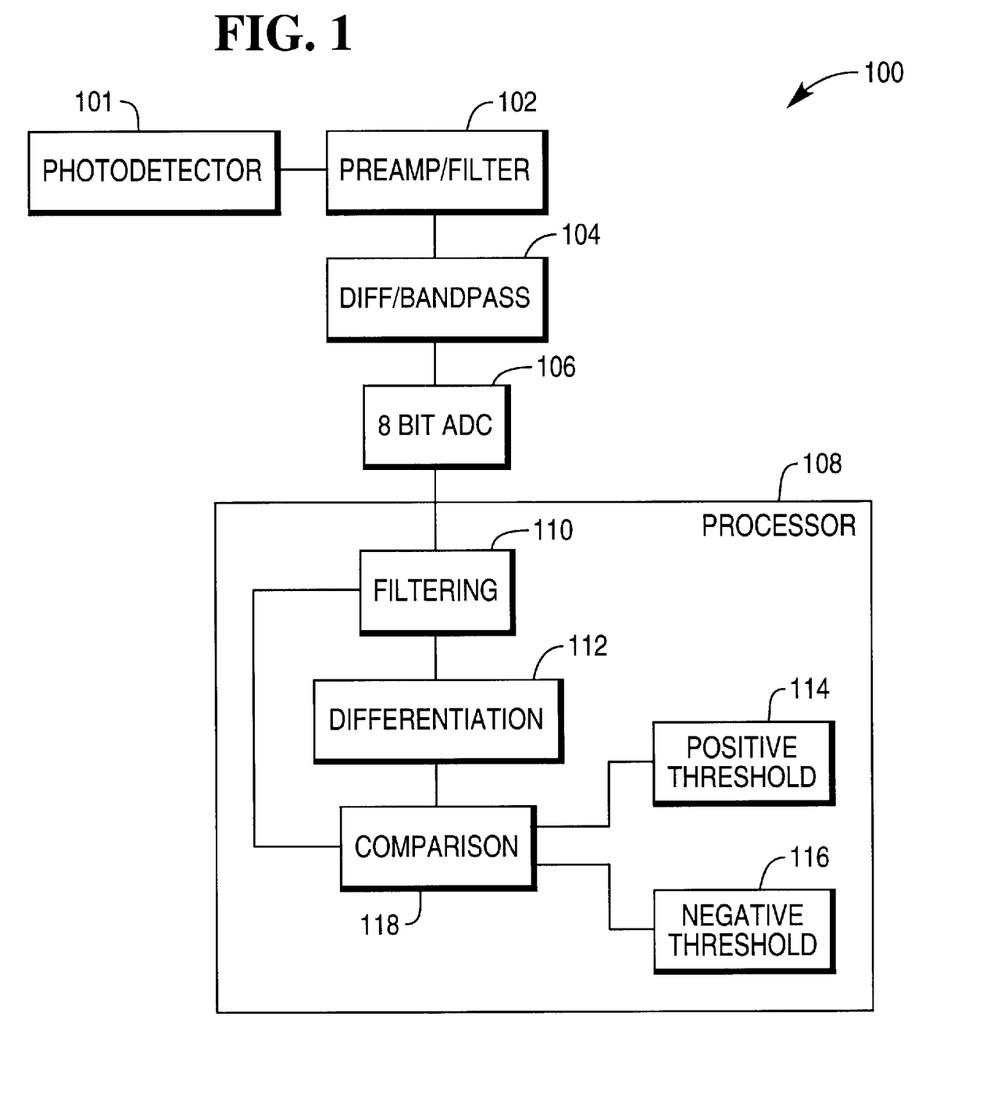
FIG. 1 illustrates a digitizing barcode processing system according to the present invention.

FIG. 1 illustrates a barcode processing system 100 according to the present invention. The barcode processing system 100 includes a photodetector 101, which produces a photocurrent in response to light falling on the photodetector 101 during scanning of a barcode. The system 100 includes a preamplifier and lowpass filter combination 102, a differentiator and bandpass filter combination 104 and an 8 bit ADC 106. The preamplifier/filter combination 102 converts the photocurrent to a voltage, filters noise and amplifies the voltage to produce a photovoltage signal. The differentiator/filter combination 104 takes an analog first derivative of the photovoltage signal and further filters the signal to produce a first derivative signal. The first derivative signal has a higher gain in portions of the signal which are of higher frequency. In addition, differentiation produces a first derivative signal which is free of any DC components. The first derivative signal is then provided to the ADC 106, which digitizes the first derivative signal to produce a digital first derivative signal. The ADC is sufficiently fast to produce a sampling error of no more than 5% of the width of the narrowest bar or space in a barcode. The maximum digitization error in theory equals one sampling interval (½ interval at each end of a barcode element, that is, a bar or a space). If the pulse width is 160 ns, as is typical for a scanner having a frequency of 3 MHz, the sampling interval should be 5% of 160, or 8 ns. In this way, one sampling interval (the maximum theoretical error) would be 5% of the pulse width. Thus, a sampling rate of 125 MHz is required for the ADC 106 if used with a scanner employing a 3 MHz frequency. For different scanning frequencies, and therefore pulse widths, different ADC frequencies would be employed. For example, if a scanning frequency of 1 MHz is used, the ADC frequency would be 48 MHz.

The ADC 106 passes the digital first derivative signal to a processor 108. The processor 108 may suitably be a field programmable gate array (FPGA) or an application specific integrated circuit (ASIC). The processor 108 processes the digital first derivative signal to identify logic transitions.

The processor 108 includes a low pass filtering function 110, which is preferably a programmable Gaussian filter, although other low pass filtering may suitably be used. The width of the Gaussian filter is programmable. The Gaussian filtering does not introduce phase shift into the first derivative signal, because no complex calculations are used. That is, all filtering calculations are performed using real numbers.

While Gaussian filtering is disclosed here, it is a routine matter to program the processor 108 to perform any of numerous kinds of mathematical filtering, as required by the needs of the particular operating environment.

After filtering is complete, the digital first derivative signal is subjected to a differentiation function 112 which produces a digital second derivative signal. As the differentiation is taking place, the first derivative signal is also analyzed by a positive threshold function 114 and negative threshold function 116 to produce positive and negative thresholds for comparison with the peaks of the first derivative signal. The positive threshold includes a DC component which is established to eliminate false peaks due to paper noise, such as a white margin appearing before a barcode, and electronic background noise. The DC component may be preprogrammed or may be set based on information received from a microcontroller in a barcode scanner employing the processing system 100. The positive threshold also includes an AC threshold component based on the energy of the peaks of the first derivative signal. Depending on the specific implementation, the negative threshold function 116 may compute the negative threshold simply by multiplying the positive threshold by negative one, or may independently compute a negative threshold.

The first derivative signal, second derivative signal, positive threshold and negative threshold are processed by a comparison function 118. The comparison function examines each peak of the first derivative signal to determine if it exceeds the positive or negative threshold. If a positive peak exceeds the positive threshold, the second derivative signal is examined for a zero crossing within a predetermined time window. The time window may be very small, on the order of several sampling intervals of the ADC 106. This small window may be utilized because no phase shift is introduced in the digital processing of the first derivative signal, so that it is not necessary to widen the time window in order to allow for phase shifting of the sort which would be introduced by analog processing. If desired, however, it is possible to set the time window relatively wide, on the order of that which would be used in an analog system. The time window may suitably be adjusted in accordance with the threshold.

In contrast to the present system, an analog barcode processing system is required to have a relatively wide time window because of the phase shift introduced by analog filtering, and because variations in the scanning operation cause significant differences in the phase of the signal produced. For example, a barcode may be relatively far from or near the scanner during a scan. If the barcode is close to the scanner, the linear speed of the scan across the barcode is lower and the frequency of the signal produced is lower. If the barcode is farther from the scanner, the linear speed of the scan is higher and the frequency of the signal is higher. Signals with different frequencies have different phases, requiring a relatively wide time window in order to accommodate the different phase shifts which may be encountered. In addition, signals with different frequencies have different amplitudes, causing difficulties in setting a threshold to accommodate the different signal amplitudes. The digital threshold of the present invention, by contrast, is more easily adjusted, and therefore more easily adapted to varying signals.

If a negative zero crossing is found within the time window, a negative logic transition is recognized. On the other hand, if a negative peak of the first derivative signal exceeds the negative threshold, the second derivative signal is examined for a positive zero crossing within the time window. If a positive zero crossing is found, a positive logic transition is recognized.

Figure 2:
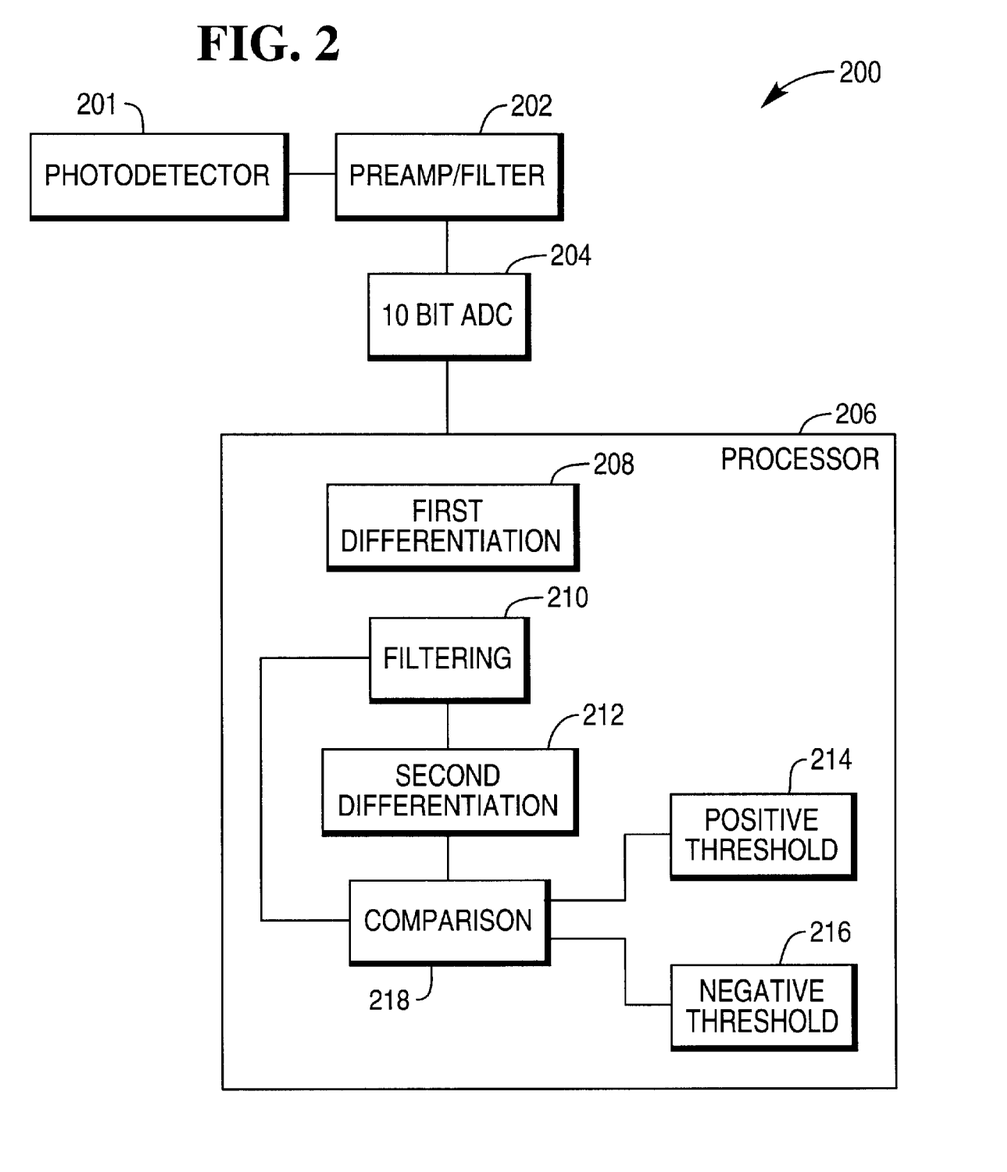
FIG. 2 illustrates an alternative aspect of a digitizing barcode processing system according to the present invention.

FIG. 2 illustrates an alternative barcode processing system 200 according to the present invention. The processing system 200 includes a photodetector 201, a preamplifier/filter stage 202, a 10 bit ADC 204 and a processor 206. The processing system differs from the processing system 100 in that the processing system 200 digitizes the photovoltage before the first derivative is taken. For this reason the ADC 204 must have more bits of output than are required for the ADC 106. This requirement results because the photovoltage signal produced by the preamplifier/filter stage 202 has a wider range in amplitude than does the first derivative signal produced by the differentiator/filter combination 104. Furthermore, the photovoltage signal produced by the preamplifier/filter stage 202 may have a DC offset. Therefore, the ADC 204 must have a greater bit capacity in order to create a sufficiently accurate representation of the photovoltage.

The ADC 204 digitizes the photovoltage and supplies the digitized photosignal to the processor 206. The processor 206 then processes the digitized photosignal to identify logic transitions represented by the photosignal. The processor 206 includes a first digital differentiation function 208 which differentiates the photosignal to create a digital first derivative signal. Once the digital first derivative signal is created, the processor 206 processes the digital first derivative signal and identifies logic transitions represented by the first derivative signal in a manner similar to the processor 108 of FIG. 1, using a digital filtering function 210, a digital second differentiation function 212, a digital positive threshold creation function 214, a digital negative threshold creation function 216 and a comparison function 218.

Figure 3:
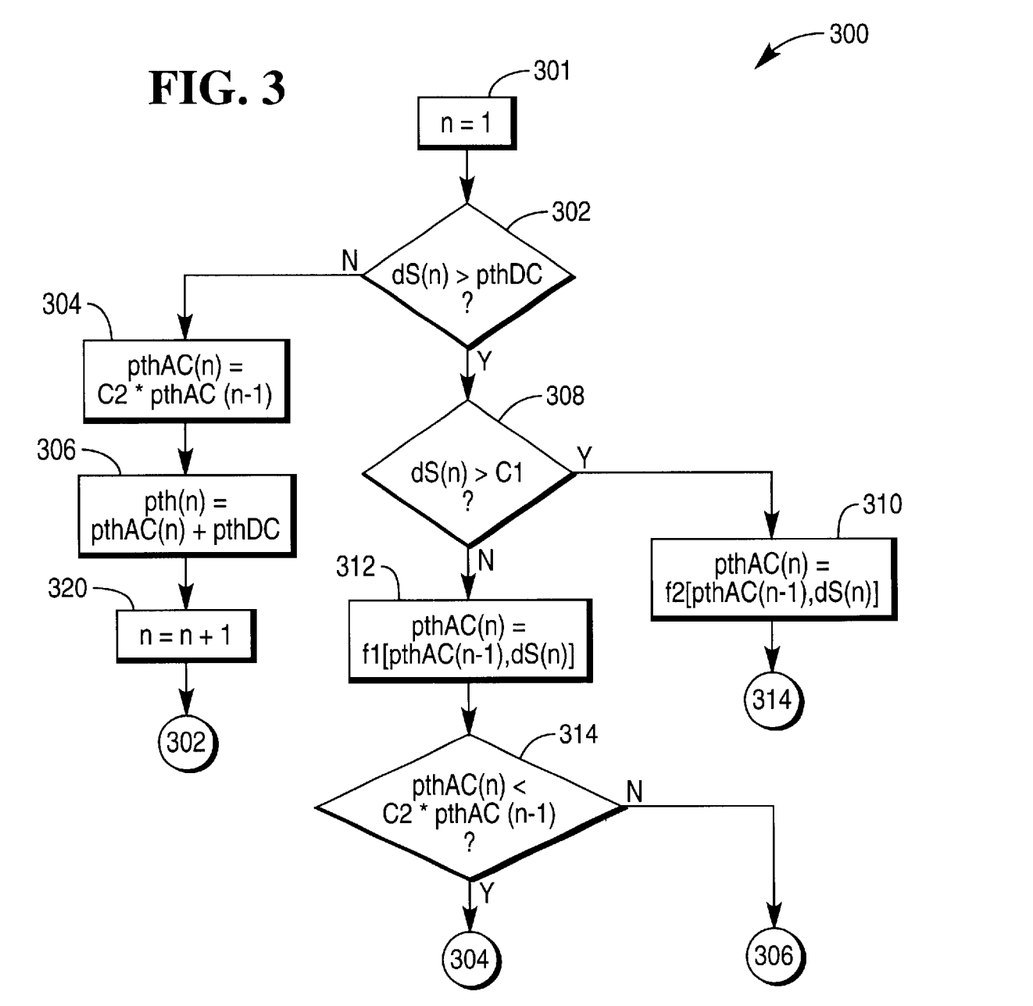
FIG. 3 illustrates a method for generating a positive threshold according to the present invention.

FIG. 3 illustrates a method 300 of digital positive threshold generation which may be suitably employed in barcode processing according to the present invention. The method 300 may suitably be employed by the processor 108 or 206 to perform digital positive threshold generation.

The method 300 is employed to create a threshold for a digital signal based on a photosignal produced by scanning a barcode. The digital signal consists of a plurality of samples. Threshold values are created for each sample making up the signal. At step 301, a sample number is set to 1. At step 302, a first derivative signal sample dS(n) is compared to a predetermined DC threshold value. If the sample dS(n) does not exceed the DC threshold, the process proceeds to step 304 and the AC threshold is allowed to decay toward zero at a rate controlled by a predetermined constant C2. This means that pthAC(n), that is, the value of the AC component of the positive threshold for the sample dS(n), is set to C2*pthAC(n−1). The constant C2 is chosen to limit the decay rate of the threshold value. The threshold value should be permitted to rise rapidly, but should not be permitted to decline rapidly. Next, the process proceeds to step 306 and pthAC(n) is summed with the DC threshold pthDC to create the threshold value pth(n). The process then proceeds to step 320 and the sample number n is incremented by 1. The process then returns to step 302.

If the sample dS(n) exceeds the DC threshold, the process proceeds to step 308 and the sample dS(n) is compared to a programmable constant C1, where C1 is a constant chosen to add nonlinearity to the AC threshold component. The constant C1 is chosen to make sure that the threshold exceeds the expected baseline noise level, and is greater than the predetermined DC threshold value pthDC. If the sample dS(n) exceeds the constant C1, the process proceeds to step 310 and an AC threshold value pthAC(n) is given the value f2[pthAC(n−1),dS(n)], where f2 is a function chosen to adjust the threshold by taking into account the present sample and previous samples. For example, the function may be chosen to be f2=((pthAC(n−1)*7+(dS(n)−pthDC) *5/64)+(dS(n)−C1)*1/4). This takes into account the AC threshold for a previous sample, the value of the present sample, the value of the DC threshold and the difference between the present sample and the constant C1.

Next, the process proceeds to step 314 and pthAC(n) is examined to determine if it is less than C2*pthAC(n−1), where C2 is a programmable constant. If pthAC(n) is less than C2*pthAC(n−1), then the process proceeds to step 304 and the value of pthAC is allowed to decay toward zero by setting the value of pthAC(n) to the value C2*pthAC(n−1). Next, the process proceeds to step 306 and pthAC(n) is summed with the DC threshold pthDC to create the threshold value pth(n). The process then proceeds to step 320 and the sample number n is incremented by 1. The process then returns to step 302.

Referring back to step 308, If the sample dS(n) does not exceed the constant C1, the process proceeds to step 312 and pthAC(n) is given the value f1[pthAC(n−1),dS(n)], where f1 is a function chosen to adjust the threshold by taking into account the present sample and previous samples. For example, the formula used to compute the function f1 may be f1=(pthAC(n−1)*7)+(dS(n)−pthDC)*5/64. This takes into account the AC threshold for the previous sample, and the difference between the present sample and the DC threshold. It should be noted that it is not necessary to limit the samples examined to the present sample and previous samples. If desired, a range of samples in the vicinity of the present sample may be used. For example, an alternative formula which may be employed to compute the function f1 is f1={pthAC(n−1)*28+[dS(n−8)+dS(n−7)+dS(n−6)+ . . . +dS(n)+dS(n+6)+dS(n+7)]/16}/32. This takes into account an entire range of samples on each side of the sample for which the threshold point is being computed. Next, the process proceeds to step 314 and pthAC(n) is examined to determine if it is less than C2*pthAC(n−1), where C2 is a programmable constant. If pthAC(n) is less than C2*pthAC(n−1), then the process proceeds to step 304 and the value of pthAC is allowed to decay toward zero by setting the value of pthAC(n) to the value C2*pthAC(n−1). Next, the process proceeds to step 306 and pthAC(n) is summed with the DC threshold pthDC to create the threshold value pth(n). The process then proceeds to step 320 and the sample number n is incremented by 1. The process then returns to step 302.

Referring back to step 314, if the value pthAC(n) is not less than C2*pthAC(n−1), the process proceeds to step 306 and pthAC(n) is summed with the DC threshold pthDC to create the threshold value pth(n). The process proceeds to step 320 and the sample number n is incremented. The process then returns to step 302.

Figure 4:
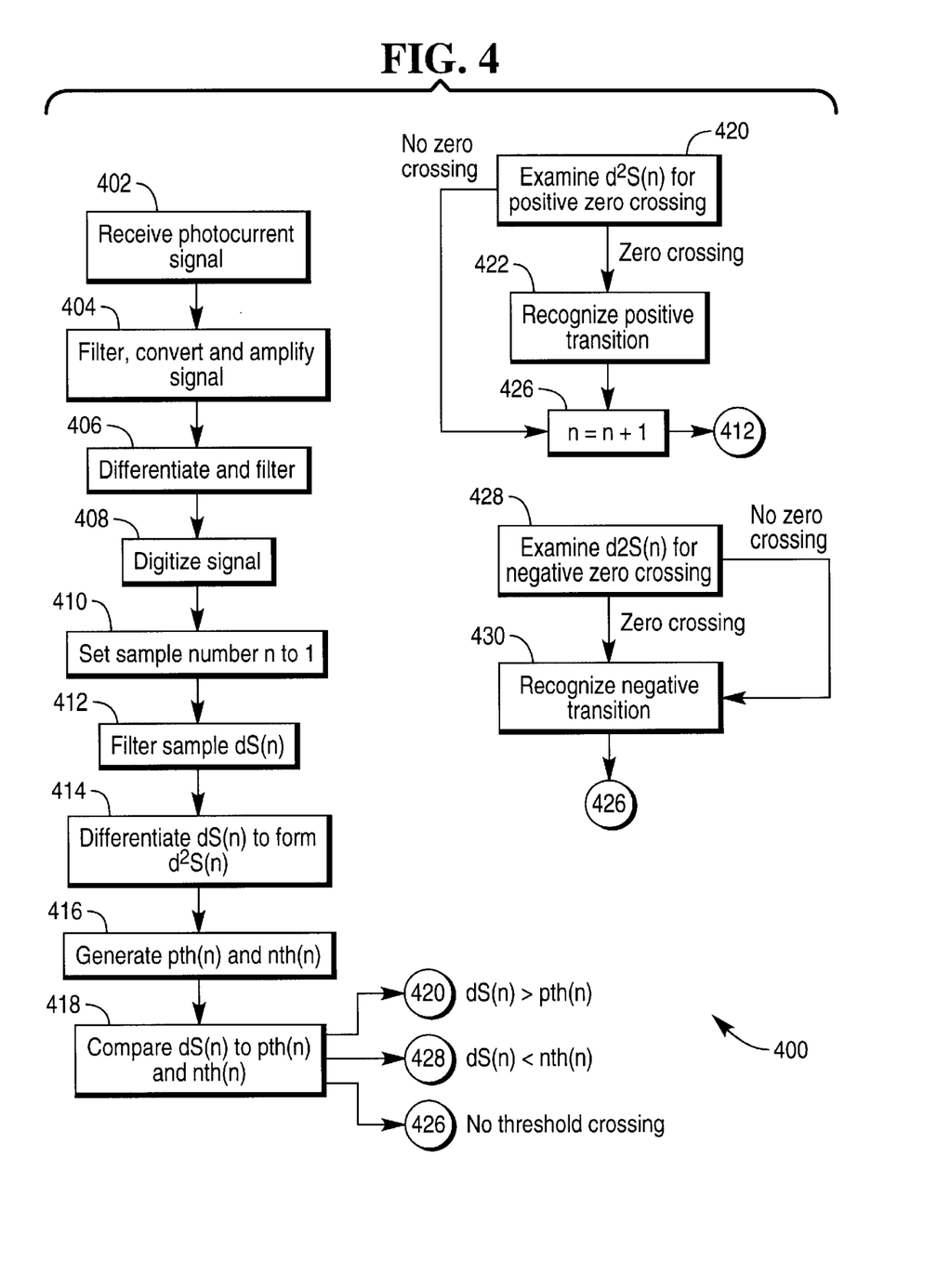
FIG. 4 illustrates a method of barcode processing according to the present invention.

FIG. 4 illustrates a method 400 of barcode processing according to the present invention. At step 402, a photocurrent signal is continuously received from a barcode scanner. Control signals for use in setting threshold levels may also be received from the scanner. At step 404, the photocurrent signal is filtered to remove noise peaks, converted to a voltage and amplified to produce a photovoltage. At step 406, the photovoltage is differentiated and subjected to bandpass filtering to produce a first derivative voltage. At step 408, the first derivative voltage is converted to a digital first derivative signal comprising a series of samples, each sample being numbered n, where n is incremented at the end of each processing cycle. The samples are then analyzed in sequence to identify logic transitions represented by the digital first derivative signal. At step 410, the sample number n is set to 1. At step 412, the digital first derivative signal sample dS(n) is subjected to digital lowpass filtering. The filtering used is preferably Gaussian filtering with the filter width being programmed as required by the characteristics of the anticipated signal. At step 414, the digital first derivative signal sample n is differentiated to form a digital second derivative $d^2S(n)$. At step 416, a digital positive threshold pth(n) and a digital negative threshold nth(n) are generated for the sample dS(n).

At step 418, the sample dS(n) is examined to determine if it exceeds the digital positive threshold pth(n) or the digital negative threshold nth(n). If the sample dS(n) exceeds the digital positive threshold pth(n), the process proceeds to step 420 and the digital second derivative sample $d^2S(n)$ is examined to determine if it represents a negative zero crossing, that is, the sample $d^2S(n)$ is examined to determine if it is less than or equal to 0 and the sample $d^2S(n−1)$, that is, the previous digital second derivative sample, is examined to determine if it is greater than 0. If both these conditions are met, the digital second derivative sample $d^2S(n)$ is at or below zero while the previous sample was above zero. Thus, the sample $d^2S(n)$ represents a negative zero crossing. If the sample $d^2S(n)$ represents a negative zero crossing, the process proceeds to step 422 and a negative logic transition is recognized. If the sample $d^2S(n)$ does not represent a negative zero crossing, the process proceeds to step 426 and the value of n is incremented. The process then returns to step 412.

Referring back to step 418, if the sample dS(n) is less than the digital negative threshold nth(n), meaning that the sample exceeds the digital negative threshold nth(n) in the negative direction, the process proceeds to step 428 and the digital second derivative sample $d^2S(n)$ is examined to determine if it represents a positive zero crossing, that is, the sample $d^2S(n)$ is examined to determine if it is greater than or equal to 0 and the sample $d^2S(n−1)$, that is, the previous second derivative sample, is examined to determine if it is less than 0. If both these conditions are met, the second derivative sample $d^2S(n)$ is at or above zero and the previous sample was below zero. Thus, the sample $d^2S(n)$ represents a positive zero crossing. If the sample $d^2S(n)$ represents a positive zero crossing, the process proceeds to step 430 and a positive logic transition is recognized. If the sample $d^2S(n)$ does not represent a positive zero crossing, the process proceeds to step 426 and the value of n is incremented. The process then returns to step 412.

Referring back to step 418, if the sample dS(n) does not exceed either the positive or the negative threshold, the process proceeds to step 426 and the value of n is incremented. The process then returns to step 412.

Figure 5A:
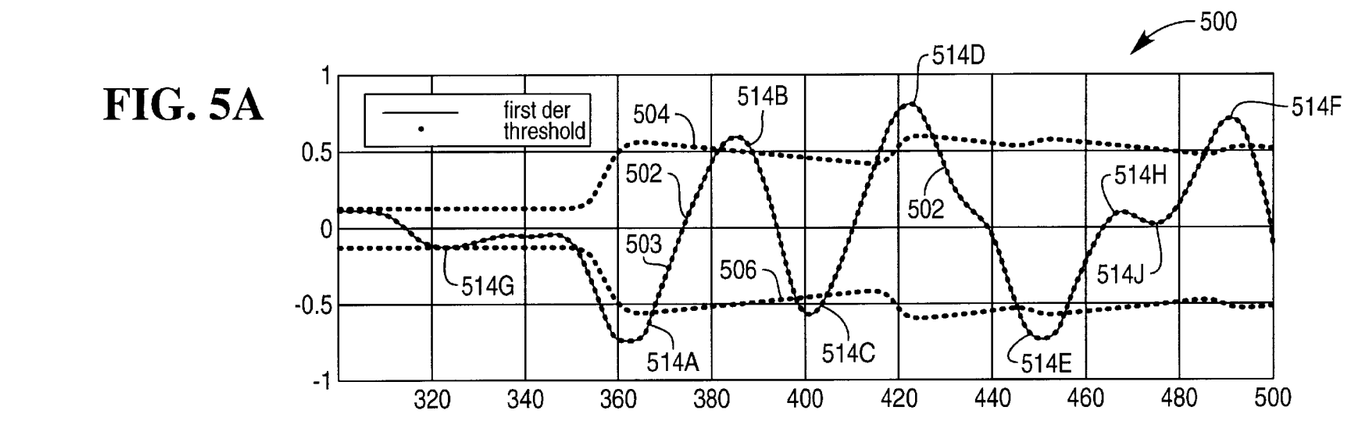
FIG. 5A illustrates a digitized first derivative curve and positive and negative thresholds produced by a barcode processing system according to the present invention.

FIG. 5A illustrates a graph 500 showing a digitized first derivative curve 502 representing a digitized first derivative signal produced by a barcode processing system according to the present invention. The curve represents voltage plotted against sample intervals, with each sample interval being approximately 42 ns. The curve 502 comprises dots such as the dot 503 representing sample points, with lines connecting the dots in order to provide ease of viewing. The first graph 500 also includes a positive threshold curve 504 and a negative threshold curve 506. The positive threshold curve 504 illustrates a positive threshold which may be generated by the process described above in connection with FIG. 3. As illustrated here, the negative threshold curve 506 is generated by inverting the positive threshold curve, or in other words, by multiplying the positive threshold curve 504 by negative 1.

As noted above in connection with FIG. 3, the positive threshold curve 504 includes a constant DC component and a varying AC component. The AC component varies with the energy of the peaks of the first derivative curve 502 and allows adaptation of the threshold value to the characteristics of the signal. If the signal peaks are high, the threshold is set higher so that higher noise peaks associated with higher signal peaks will be properly eliminated. If the signal peaks are low, the threshold is set lower so that the lower signal peaks will meet the threshold.

Figure 5B:
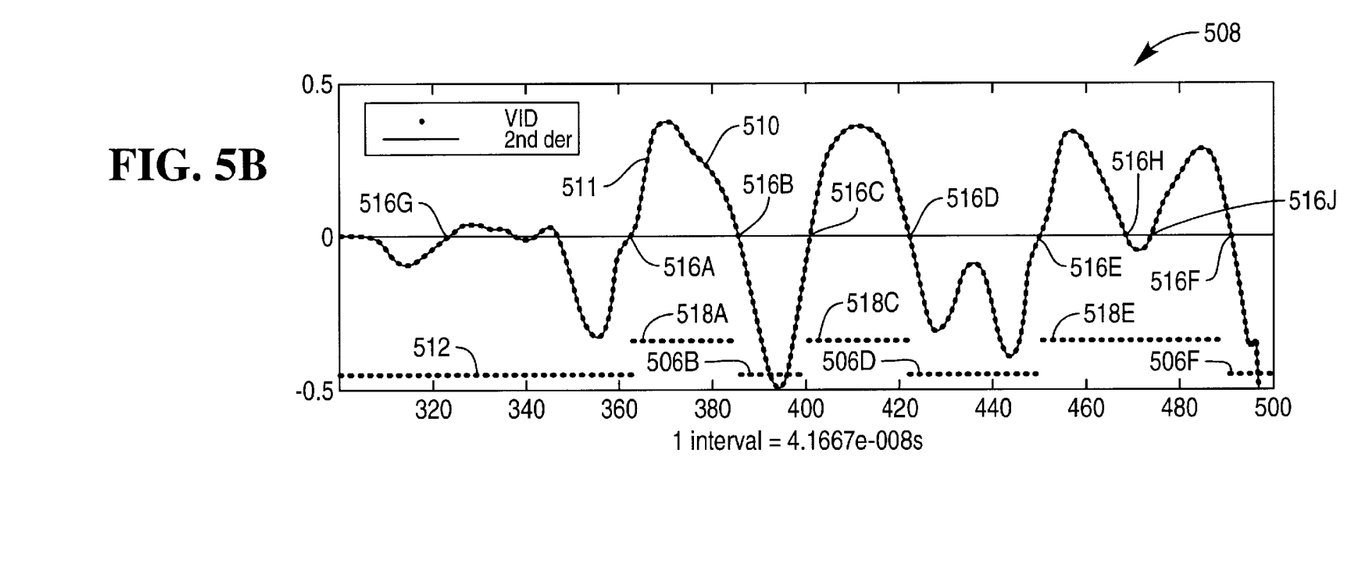
FIG. 5B illustrates a digitized second derivative curve and logic transition curve produced by a barcode processing system according to the present invention.

FIG. 5B illustrates a graph 508 including a digitized second derivative curve 510, which represents a second derivative signal $d^2S$ produced by a barcode processing system according to the present invention. The curve 110 represents voltage plotted against sample intervals, with a sample interval being approximately 42 ns. The second derivative curve 510 comprises dots such as the dot 511, which represent sample points, with the dots connected by lines for ease of viewing. The second graph 508 also includes a logic transition curve 512, representing logic transitions represented by the photovoltage. The logic transition curve 512 illustrates a negative logic transition whenever a positive peak of the first derivative curve 502 exceeds the positive threshold curve 504 and the second derivative curve 510 simultaneously experiences a negative zero crossing within a predetermined time window. The logic transition curve 512 illustrates a positive logic transition whenever a negative peak of the first derivative curve 502 exceeds the negative threshold curve 506 and the second derivative curve 510 sinultaneously experiences a positive zero crossing. Thus, the negative peak 514A exceeds the negative threshold 506. At the same time, the second derivative curve 504 undergoes a positive zero crossing at 516A, within a predetermined time after the negative peak 514A exceeds the negative threshold 506. Therefore, the logic transition curve exhibits a positive transition 518A. The positive peak 514B exceeds the positive threshold 504 and the second derivative curve undergoes a negative transition at 516B. Therefore, the logic transition curve 512 exhibits a negative transition 518B. Similarly, the logic transition curve 510 exhibits a positive transition 518C at the negative peak 514C and positive zero crossing 516C, a negative transition 518D at the positive peak 514D and negative zero crossing 516D, a positive transition 518E at the negative peak 514E and positive zero crossing 516E, and a negative transition 518F at the positive peak 514F and negative zero crossing 516F.

Even though the second derivative curve makes a zero crossing at 516G, 516H and 516J, no logic transitions are recognized because the peaks 514G, 516H and 516J of the first derivative curve 502 do not exceed the positive threshold 504 or negative threshold 506.

The barcode processing system according to the present invention includes numerous advantages over prior art systems, including the reduction or elimination of phase shifts, the ability to adjust thresholds and the ability to process small signals without being limited by offset voltages inherent in analog comparators. It is also possible to perform multiple parallel processing by splitting a digitized signal into multiple channels and performing processing on each channel, with different filter and threshold values being used for each channel. The channel producing the best logic signal could then be selected as the output of the processing system.

A further advantage of a barcode processing system according to the present invention is the ability to generate multiple thresholds. That is, it is a simple matter to produce a negative threshold which is independent of the positive threshold. Thresholds can be generated such that the positive threshold depends on the energy of the positive peaks and the negative threshold depends on the energy of the negative peaks. If the negative threshold is simply a mirror image of the positive threshold, a narrow bar which follows a wide space may be missed because it does not meet the threshold. A wide space would generate a high positive peak, resulting in a high positive threshold. Because the negative threshold would simply be a reflection of the positive threshold, the narrow bar, which would generate a smaller negative peak, might be missed.

Because the digital processing employed by a barcode processing system according to the present invention provides fast and simple adjustments of thresholds and other characteristics, it is possible to employ a true dual threshold, comprising a positive threshold which is adjusted according to positive peaks, and a negative threshold which is adjusted according to negative peaks. This adjustment technique prevents a positive threshold from overwhelming negative peaks.

Figure 6:
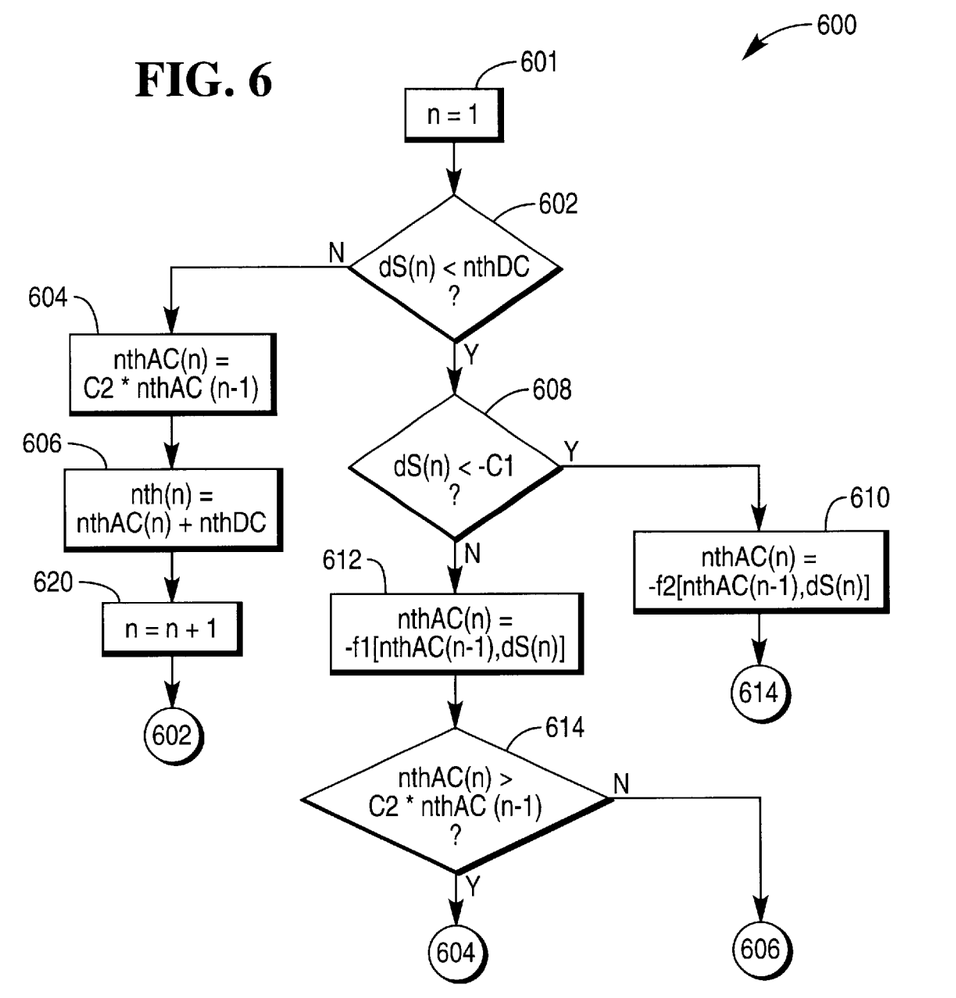
FIG. 6 illustrates a method for generating a negative threshold according to the present invention.

FIG. 6 illustrates a method 600 of negative threshold generation which may be suitably employed in barcode processing according to the present invention. The method 600 may suitably be employed by the processor 108 or 206 to perform positive threshold generation. Threshold values are created for each sample making up the signal. At step 601, a sample number is set to 1. At step 602, a first derivative signal sample dS(n) is compared to a predetermined DC threshold value nthDC to determine if the sample dS(n) is less than the DC threshold value. Because the threshold is a negative threshold, the DC threshold value will be a negative value and the threshold will be exceeded if the sample dS(n) has a higher negative value, that is, is less than the DC threshold value. If the sample dS(n) is not less than the DC threshold, the process proceeds to step 604 and the AC threshold is allowed to decay toward zero at a rate controlled by a predetermined constant C2. This means that the value of nthAC(n), that is, the AC component of the negative threshold for the sample dS(n), is set to C2*nthAC(n−1). Next, the process proceeds to step 606 and nthAC(n) is summed with the DC threshold nthDC to create the threshold value nth(n). The process then proceeds to step 620 and the sample number n is incremented. The process then returns to step 602.

If the sample dS(n) is less than the DC threshold, the process proceeds to step 608 and the sample dS(n) is compared to a programmable constant −C1, where −C1 is less than the predetermined DC threshold value nthDC. That is, the constant −C1 has a larger negative value than the DC threshold value nthDC. The value -C1 may suitably be the negative of the value C1 described in association with FIG. 3, and used in determining the positive threshold. If the sample dS(n) is less than the constant −C1, that is, if the sample dS(n) exceeds the constant -C1 in the negative direction, the process proceeds to step 610 and the AC threshold value nthAC(n) is given the value −f2[nthAC(n−1),dS(n)]. The function −f2[nthAC(n−1),dS(n)] may suitably be the negative of the function f2[pthAC(n−1),dS(n)] described in FIG. 3, also having the argument nthAC(n−1) substituted for the argument pthAC(n−1) and the value nthDC substituted for the value pthDC.

Next, the process proceeds to step 614 and nthAC(n) is examined to determine if it is greater than C2*nthAC(n−1), where C2 is a programmable constant. That is, nthAC(n) is examined to determine if it has a smaller negative value than C2*nthAC(n−1). If yes, then the process proceeds to step 604 and the value of nthAC is allowed to decay toward zero by setting the value of nthAC(n) to the value C2*nthAC(n−1). Next, the process proceeds to step 606 and nthAC(n) is summed with the DC threshold nthDC to create the threshold value nth(n). The process then proceeds to step 620 and the sample number n is incremented. The process then returns to step 602.

Referring back to step 608, If the sample dS(n) is not less than the constant C1, the process proceeds to step 612 and nthAC(n) is given the value -f1[nthAC(n−1),dS(n)]. The function -f1[nthAC(n−1),dS(n)] may suitably be the negative of the function f1[pthAC(n−1),dS(n)] described in FIG. 3, also having the argument nthAC(n−1) substituted for the argument pthAC(n−1) and the value nthDC substituted for the value pthDC.

Next, the process proceeds to step 614 and nthAC(n) is examined to determine if it is greater than C2*nthAC(n−1), where C2 is a programmable constant. That is, nthAC(n) is examined to determine if it has a smaller negative value than C2*nthAC(n−1). If yes, then the process proceeds to step 604 and the value of nthAC is allowed to decay toward zero by setting the value of nthAC(n) to the value C2*nthAC(n−1). Next, the process proceeds to step 606 and nthAC(n) is summed with the DC threshold nthDC to create the threshold value nth(n). The process then proceeds to step 620 and the sample number n is incremented. The process then returns to step 602.

Referring back to step 614, if the value nthAC(n) is not greater than C2*nthAC(n−1), the process proceeds to step 606 and nthAC(n) is summed with the DC threshold nthDC to create the threshold value nth(n). The process then proceeds to step 620 and the sample number n is incremented. The process then returns to step 602.

Figure 7:
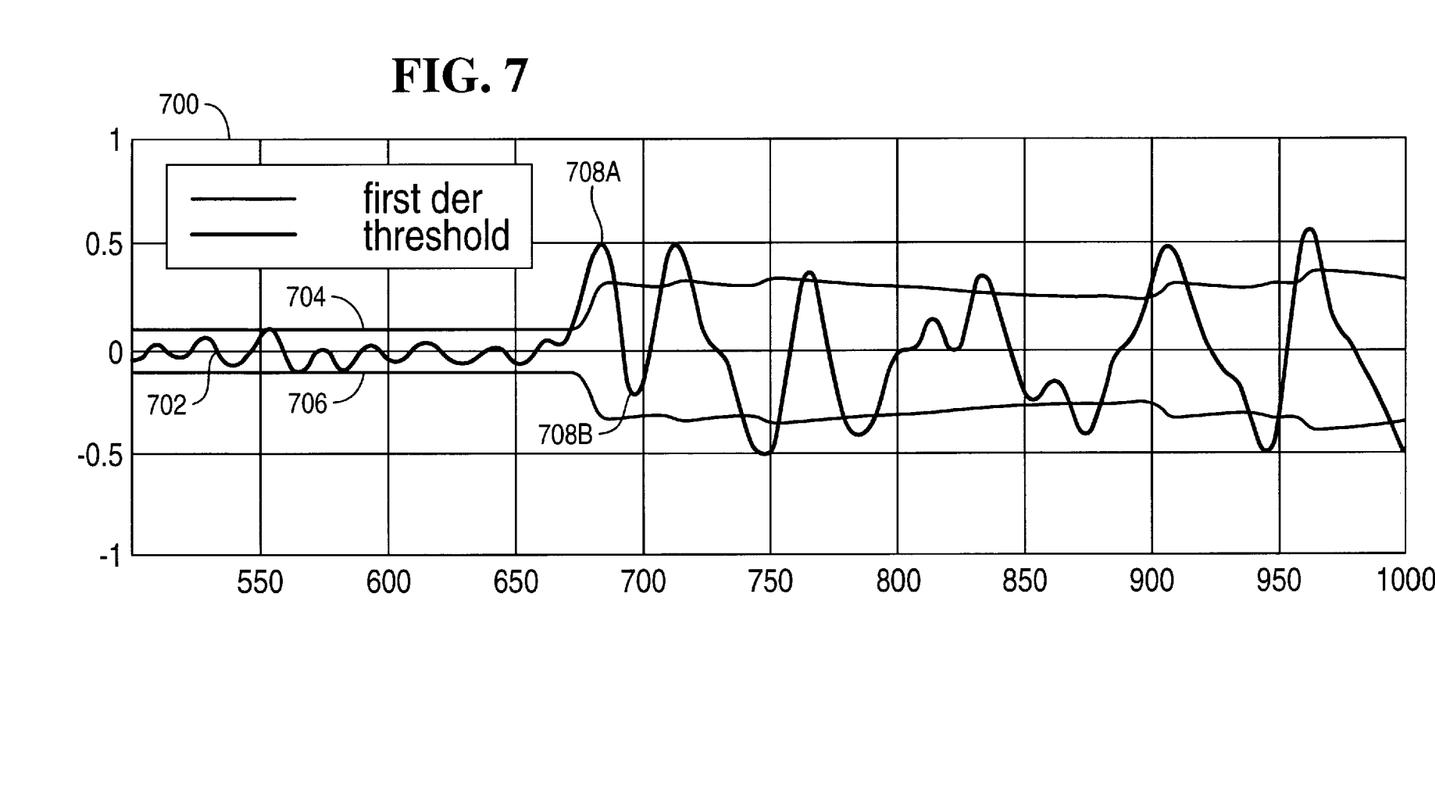
FIG. 7 is a graph of a first derivative curve and positive and negative threshold curves produced by a barcode processing system according to the present invention, the negative threshold curve being a reflection of the positive threshold curve.

FIG. 7 is a graph 700 illustrating a first derivative curve 702 produced by a barcode processing system according to the present invention. The graph 700 also includes a positive threshold curve 704 and a negative threshold curve 706. The negative threshold curve 704 is generated by multiplying the positive threshold curve 704 by negative 1. The first derivative curve includes a number of peaks, of which the first and second peaks 708A and 708B are of particular interest. The first peak 708A has a high amplitude and causes a significant increase in the level of the positive threshold curve 704. Because the negative threshold curve 706 is simply a reflection of the positive threshold curve 704, the negative threshold curve also increases. However, the second peak 708B, which is a negative peak, has a lower amplitude. The second peak 708B fails to meet the negative threshold 706 because the negative threshold 706 changed in response to the first peak 708B.

Figure 8:
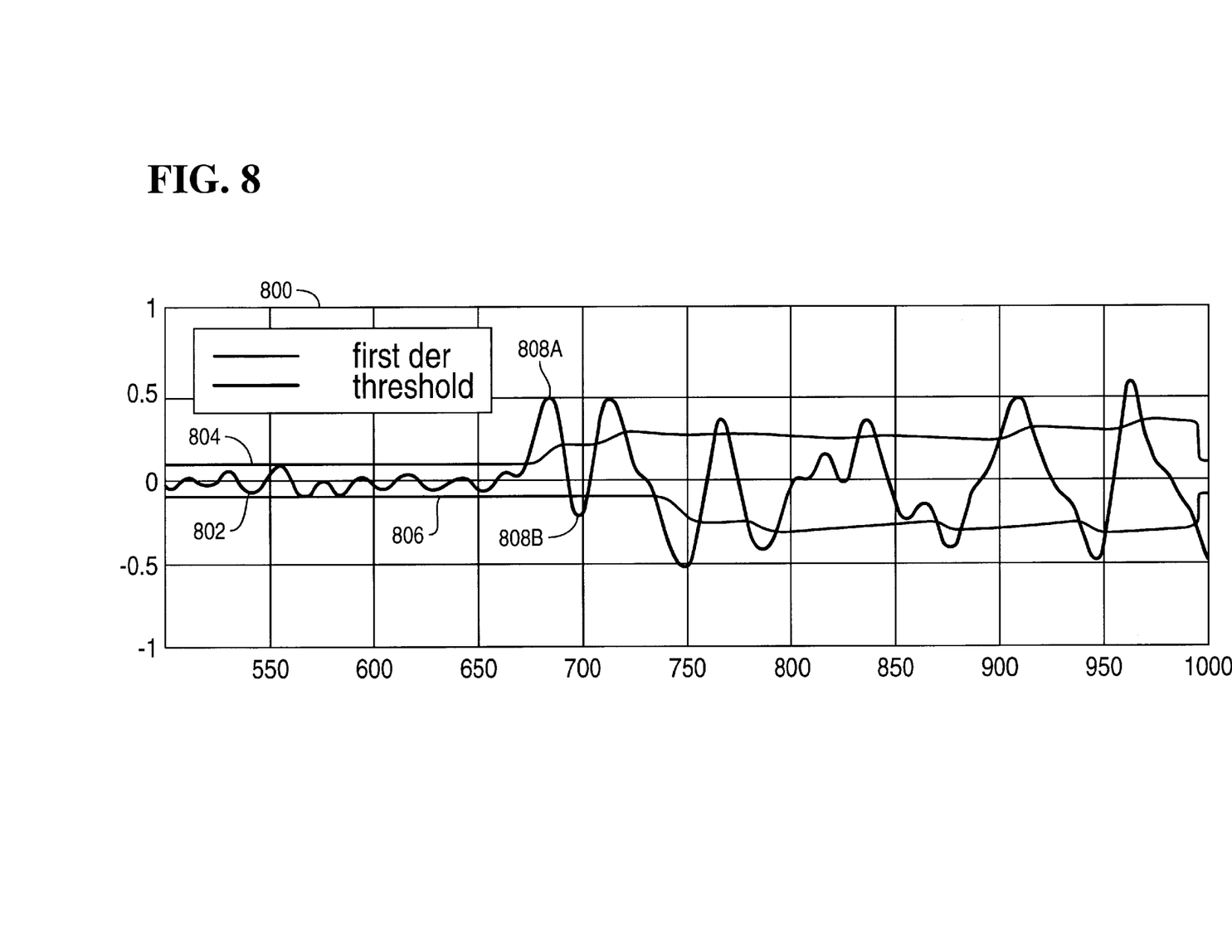
FIG. 8 is a graph of a first derivative curve and positive and negative threshold curves produced by a barcode processing system according to the present invention, the positive threshold being generated according to positive peaks of the first derivative curve and the negative threshold being generated according to negative peaks of the first derivative curve.

FIG. 8 is a graph 800 illustrating a first derivative curve 802 produced by a barcode system according to the present invention. The first derivative curve 802 is similar to the first derivative curve 702 of FIG. 7. The graph 800 also illustrates a positive threshold curve 804 and a negative threshold curve 806. The positive threshold curve 804 is generated in accordance with the positive peaks of the first derivative curve 802 and the negative threshold curve 806 is generated in accordance with the negative peaks of the first derivative curve 802. The first derivative curve 802 includes a number of peaks, of which the first and second peaks 808A and 808B are of particular interest.

The first peak 808A has a substantial amplitude and causes an increase in the positive threshold curve 804. However, the negative threshold curve 806 is produced independently of the positive threshold curve 804 and does not increase in response to the first peak 808A. The second peak 808B is a negative peak having a small amplitude, but because the negative threshold curve 806 has not increased, the second peak 808B exceeds the negative threshold and therefore will be properly recognized.

While the present invention is disclosed in the context of a presently preferred embodiment, it will be recognized that a wide variety of implementations may be employed by persons of ordinary skill in the art consistent with the above discussion and the claims which follow below.

I claim:

1. A method of generating a threshold value for processing a barcode comprising the steps of:

receiving a photocurrent signal in response to light reflected from the barcode;

generating a first derivative signal of the photocurrent signal, the first derivative signal including a series of peaks of varying amplitudes;

generating an alternating current threshold value based on the first derivative signal on an ongoing basis, the absolute value of the alternating threshold current value tending to increase with increasing absolute values of peaks of the first derivative signal and to decrease with decreasing absolute values of peaks of the first derivative signal; and generating the threshold value based on the alternating current threshold value and a direct current threshold value.

2. The method of claim 1 wherein said threshold value is a positive threshold value.

3. The method of claim 1 wherein said threshold value is a negative threshold value.

4. The method of claim 1 further comprising, after the step of generating an alternating current threshold value, the step of:

allowing the alternating current threshold value to decay toward zero.

5. The method of claim 1 further comprising, after the step of generating a first derivative signal, the step of:

comparing the first derivative signal to the direct current threshold value.

6. The method of claim 5 further comprising the step of:

comparing the first derivative signal to a constant, said constant being greater than the direct current threshold value.

7. The method of claim 1 wherein the alternating current threshold value is further based on a prior alternating current threshold value.

8. A method of barcode processing comprising the steps of:

receiving a photocurrent signal in response to light reflected from a barcode;

generating a first derivative signal of the photocurrent signal;

generating a positive threshold value based on the first derivative signal;

generating a negative threshold value based on the first derivative signal;

generating a second derivative signal of the photocurrent signal;

if the first derivative signal is greater than the positive threshold value and the second derivative signal performs a zero crossing, recognizing a positive transition of the barcode; and if the first derivative signal is less than the negative threshold value and the second digital signal performs a zero crossing, recognizing negative transition of the barcode.

9. The method of claim 8 wherein said positive transition is from a dark area to a light area of the barcode.

10. The method of claim 8 wherein said negative transition is from a light area to a dark area of the barcode.

11. The method of claim 8 further comprising the step of:

generating a direct current threshold value; and wherein the positive threshold value is further based on the direct current threshold value and the negative threshold value is further based on the direct current threshold value.

12. A barcode threshold system for generating a threshold value for processing a barcode comprising:

receiving means for receiving a photocurrent signal in response to light reflected from the barcode; and processing means for generating a first derivative signal of the photocurrent signal, the first derivative signal including a series of peaks of varying amplitudes, generating an alternating current threshold value based on the first derivative signal on an ongoing basis, the absolute value of the alternating threshold current value tending to increase with increasing absolute values of peaks of the first derivative signal and to decrease with decreasing absolute values of peaks of the first derivative signal, and generating the threshold value based on the alternating current threshold value and a direct current threshold value.

13. The system of claim 12 wherein said threshold value is a positive threshold value.

14. The system of claim 12 wherein said threshold value is a negative threshold value.

15. The system of claim 12 wherein said processing means is further for:

allowing the alternating current threshold value to decay toward zero.

16. The system of claim 12 wherein said processing means is further for:

comparing the first derivative signal to the direct current threshold value.

17. The system of claim 16 wherein said processing means is further for:

comparing the first derivative signal to constant, said constant being greater than the direct current threshold value.

18. The system of claim 12 wherein the alternating current threshold value is further based on a prior alternating current threshold value.

19. A barcode processing system comprising:

receiving means for receiving a photocurrent signal in response to light reflected from a barcode;

means for generating a first derivative signal of the photocurrent signal;

means for generating a positive threshold value based on the first derivative signal;

means for generating a negative threshold value based on the first derivative signal;

means for generating a second derivative signal of the photocurrent signal;

means for recognizing a positive transition of barcode data if the first derivative signal is greater than the positive threshold value and the second derivative signal performs a zero crossing; and means for recognizing a negative transition of barcode data if the first derivative signal is less than the negative threshold value and the second digital signal performs a zero crossing.

20. The system of claim 19 wherein said positive transition is from a dark area to a light area of the barcode.

21. The system of claim 19 wherein said negative transition is from a light area to a dark area of the barcode.

* * * * *